(No Model.)
R. G. PIKE, Jr.
WIRE STRETCHER.
No. 413,833.  Patented Oct. 29, 1889.
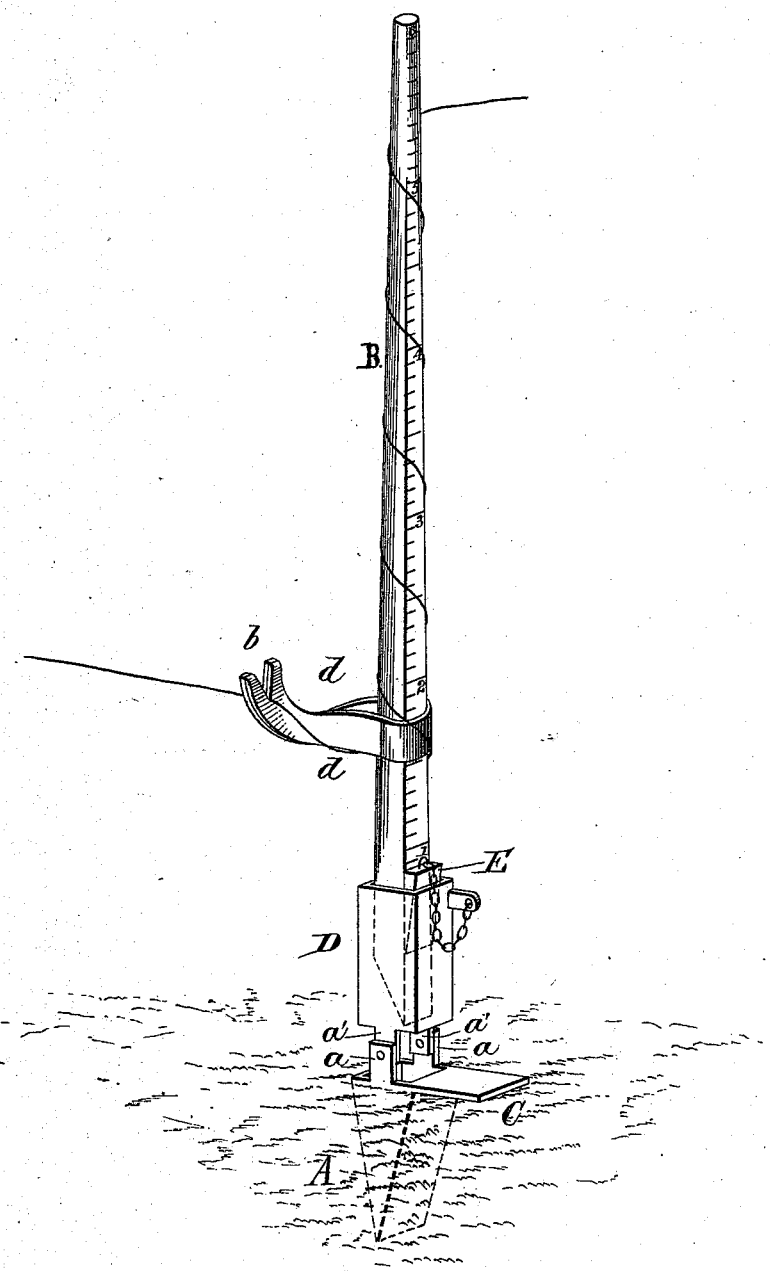
Witnesses.
Inventor.
Robert Gordon Pike Jr.

UNITED STATES PATENT OFFICE.

ROBERT G. PIKE, JR., OF BROOKLYN, NEW YORK.

WIRE-STRETCHER.

SPECIFICATION forming part of Letters Patent No. 413,833, dated October 29, 1889.

Application filed March 19, 1888. Serial No. 267,781. (No model.)

*To all whom it may concern:*

Be it known that I, ROBERT G. PIKE, Jr., a citizen of the United States, residing at the city of Brooklyn, in the county of Kings and State of New York, have invented a new and useful Improvement in Contrivances for Stretching Wire in Building Wire Fences, of which the following is a specification.

My invention is portable, comprising four principal parts combined and acting together for stretching fence-wire from post to post. The parts are made of iron, steel, or other suitable material, and are described as follows, reference being had to the accompanying drawing, which makes a part of this specification—that is to say:

A is a hollow wedge with a flange or foot-plate C attached to its top or front edge and projecting in the same plane with the top of the wedge. On the side edges of the wedge are ears $a$ $a$, to which the socket D is hinged by similar ears $a'$ $a'$, projecting from the lower edges of two opposite sides. This socket D is a rectangular box open at each end.

B is the lever, which is like an ordinary crow-bar and fits easily into the socket D, where it is blocked or fastened by a small wedge E. For the purpose of more conveniently adjusting the spring-hook, the lever is marked into foot spaces and inch spaces. A spring-hook $b$ slides up and down the lever, and is held in place by the pressure of its spring-collar and sides $d$ $d$. To prevent the wire slipping while being stretched, its loose end, after passing through the claw of the hook, is turned four or five times spirally about the lever and is there held taut by the hand. If the wire is barbed, the claw will also catch onto a barb and so be held.

The socket being hinged to the wedge, as represented in the drawing, the wedge is driven into the ground at a convenient distance from the post to which the wire is to be fastened, and in a line with the fence, until the foot-plate rests firmly upon the surface of the ground, extending in the direction the wire is to be drawn. If the lever is now inserted well into the socket and blocked with the small wedge E, you have a powerful lever movable backward and forward in the line of the fence. On this lever the spring-hook slides up and down to any point necessary for the drawing of the wire to the place where it is to be fastened, and while stretching the wire the operator, by planting his foot on the foot-plate, helps to keep the wedge firm in its place.

When the work is completed at any post, the lever may be taken from the socket, and by thrusting it between the wedge and the socket the wedge may be lifted out of the ground.

The large wedge A is made hollow, because it is lighter to carry about, takes less material for casting, and can be more easily worked loose from the ground by means of the lever when thrust within it. The lever may be of any convenient length. I have found one six feet long about right for a fence of ordinary height.

Now, what I claim, and desire to secure by Letters Patent of the United States, is as follows, viz:

A wire-stretcher consisting of the wedge A, provided with flange C, and the socket D, hinged to said wedge, in combination with the lever B, fitted to socket D, substantially as shown.

ROBERT G. PIKE, JR.

Witnesses:
ROBERT G. PIKE,
NICOLAS PIKE.